United States Patent
Barbara et al.

(10) Patent No.: US 8,915,777 B2
(45) Date of Patent: Dec. 23, 2014

(54) AIRCRAFT AIR CONDITIONING SYSTEM

(75) Inventors: Olivier Barbara, Puylaurens (FR); Nicolas Antoine, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 1328 days.

(21) Appl. No.: 12/017,110

(22) Filed: Jan. 21, 2008

(65) Prior Publication Data

US 2009/0149122 A1 Jun. 11, 2009

(30) Foreign Application Priority Data

Jan. 22, 2007 (FR) ...................................... 07 00403

(51) Int. Cl.
*B64D 13/00* (2006.01)
*B64D 13/06* (2006.01)

(52) U.S. Cl.
CPC ........ *B64D 13/06* (2013.01); *B64D 2013/0618* (2013.01); *Y02T 50/56* (2013.01)
USPC ........................................................ 454/76

(58) Field of Classification Search
USPC .............. 454/71, 72, 73, 74, 75, 76; 165/234, 165/235; 244/59
See application file for complete search history.

(56) References Cited

U.S. PATENT DOCUMENTS

| | | | | |
|---|---|---|---|---|
| 2,777,301 | A | * | 1/1957 | Kuhn ............................. 62/178 |
| 2,851,254 | A | * | 9/1958 | Messinger et al. ............ 165/235 |
| 2,925,255 | A | * | 2/1960 | Shaw ............................ 165/235 |
| 3,711,044 | A | * | 1/1973 | Matulich .................... 244/118.5 |
| 4,312,191 | A | * | 1/1982 | Biagini .......................... 62/402 |
| 5,299,763 | A | | 4/1994 | Bescoby |
| 5,729,969 | A | * | 3/1998 | Porte ........................... 60/226.1 |
| 5,899,085 | A | * | 5/1999 | Williams ....................... 62/236 |
| 6,058,725 | A | * | 5/2000 | Monfraix et al. .............. 62/172 |
| 6,526,775 | B1 | * | 3/2003 | Asfia et al. .................... 62/402 |

FOREIGN PATENT DOCUMENTS

| | | | |
|---|---|---|---|
| CA | 2546714 A1 | * | 2/2007 |
| EP | 0 888 966 | | 1/1999 |
| JP | 2005014745 A | * | 1/2005 |

OTHER PUBLICATIONS

Preliminary Search Report dated Aug. 7, 2006.
English translation of JP 2005-014745 (Uryu), 8 pages.

* cited by examiner

*Primary Examiner* — Steven B McAllister
*Assistant Examiner* — Brittany Towns
(74) *Attorney, Agent, or Firm* — Dickinson Wright PLLC

(57) ABSTRACT

An aircraft air conditioning system includes a main air conditioning device which taps air off a turbine engine, and an auxiliary unit with a compressor that taps ambient air and conditions it to send to a distributing device in place of a main device, when the aircraft is in cruising flight or close to cruising flight.

6 Claims, 1 Drawing Sheet

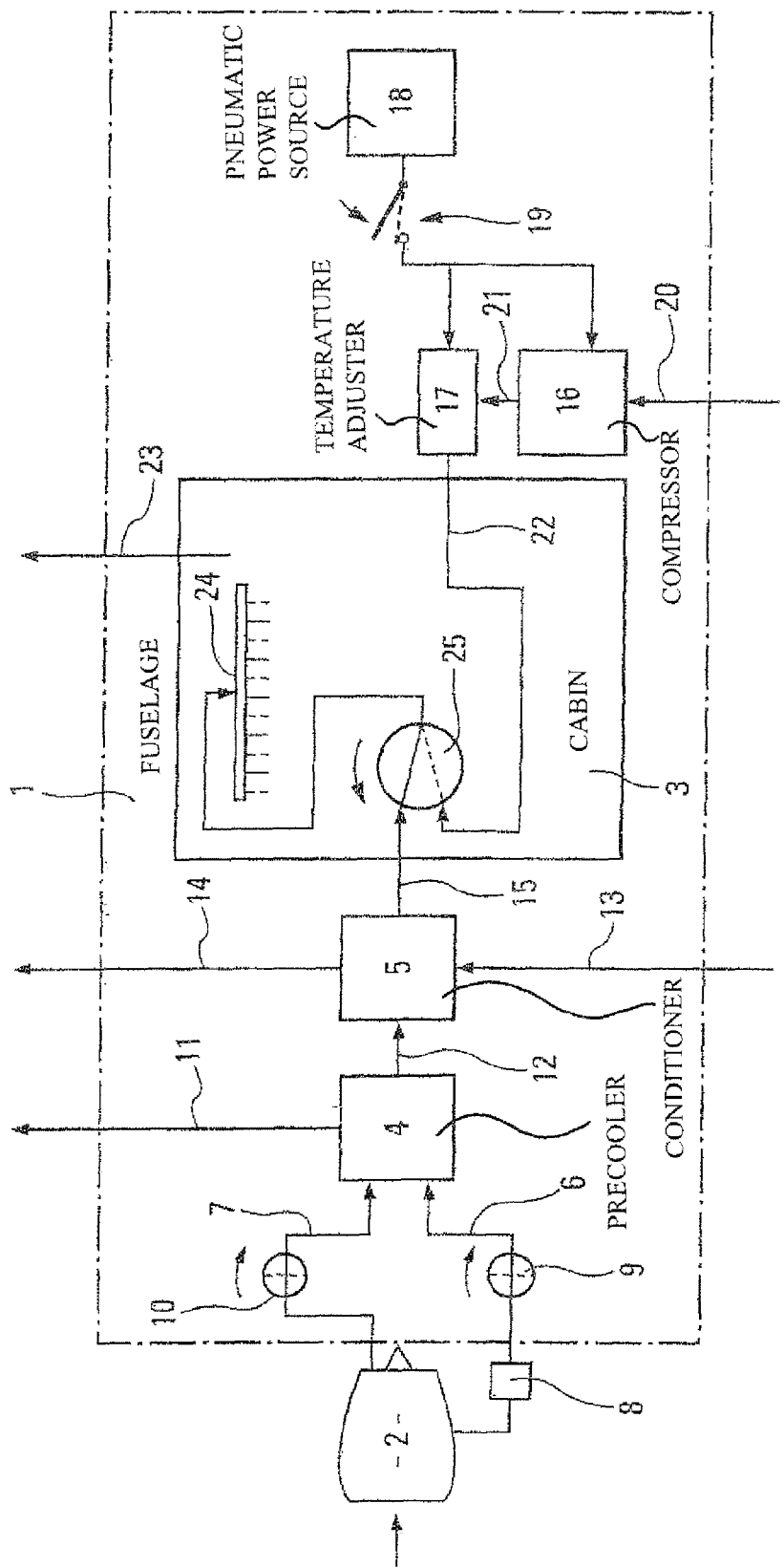

AIRCRAFT AIR CONDITIONING SYSTEM

BACKGROUND OF THE INVENTION

The subject of the present invention is an air conditioning system for an aircraft provided with at least one turbine engine.

DESCRIPTION OF THE PRIOR ART

It is known that, onboard on aircraft, the air intended for conditioning the inhabited regions, such as the passenger cabin and the flight deck for example, is tapped from the hot stream of the turbine engines. Because this hot stream is at a very high temperature (which may exceed 500° C.) and a very high pressure (of up to 20 bar or $2\times10^6$ Pa), the tapped air has its temperature and pressure lowered until it can be used for air conditioning, that is to say until it has a temperature of the order of 20 degrees Celsius and a pressure of the order of 0.7 bar ($0.7\times10^5$ Pa).

Because the hot stream of the turbine engine is the result of severely compressing (with a compression ratio of the order of 30) and raising the temperature of the ambient air drawn in by said turbine engine, it is therefore evident that, starting out from this ambient air, the conditioning air is obtained by severe compression and temperature increase, followed by severe reductions in temperature and in pressure.

Obtaining conditioning air in such a way is therefore expensive in terms of energy expenditure. It is generally estimated that the production of conditioning air by tapping off the hot stream of turbine engines represents approximately 2% of the fuel consumption given that the air has to be conditioned in all situations in which the aircraft finds itself, both in the air and on the ground.

SUMMARY OF THE INVENTION

It is an object of the present invention to overcome this disadvantage and to improve the known aircraft air conditioning systems in order significantly to reduce their fuel consumption.

To these ends, according to the invention, the air conditioning system for an aircraft provided with at least one turbine engine, said system including:
  means for tapping hot air off said turbine engine;
  means for converting said hot air thus tapped into conditioned air; and
  means for distributing said conditioned air to at least one cabin of said aircraft,
is notable in that it includes:
  an auxiliary air conditioning unit capable of tapping fresh air from outside said aircraft and of generating conditioned air from said fresh air;
  switching means allowing said distributing means to be supplied:
    with conditioned air originating from said auxiliary conditioning unit when said aircraft is in a phase of flight for which it is surrounded by dry, low-pressure air unlikely to give rise to icing, and
    with the conditioned air originating from said hot air conversion means in all other situations in which said aircraft might find itself; and
  means for interrupting the tapping of hot air off the turbine engine by said hot air tapping means when said conditioned air distributing means are being supplied from said auxiliary unit.

Thus, when the air outside the aircraft is dry, low-pressure air unlikely to give rise to icing, that is to say when said aircraft is flying at high altitude, in cruising flight or close to cruising flight, the conditioned air is produced by the auxiliary conditioning unit and not taken from the engine.

It will be noted that, because in cruising flight the total pressure of the ambient air is of the order of 0.3 to 0.4 bar (from $0.3\times10^5$ to $0.4\times10^5$ Pa), said ambient air need merely be compressed with a compression ratio of the order of 2 in order to obtain the pressure of about 0.75 bar ($0.75\times10^5$ Pa) that the conditioning air needs to have. In addition, because said ambient air is dry and unable to give rise to icing, such compression can be obtained simply using a compressor. If the temperature rise that results from compressing the ambient air using the compressor is not enough to ensure the comfort of the people inside said aircraft cabin, then said auxiliary air conditioning unit may, in addition to said compressor, include means for adjusting the temperature of the air leaving said compressor.

Calculation and experimentation have shown that a compressor rated at a few tens of kilowatts is powerful enough to produce the conditioning air, if necessary combined with said temperature adjusting means, in cruising flight.

It will readily be understood that implementing the present invention using a compressor that does not consume a great deal of energy makes it possible to make significant energy savings, because, according to the prior art, in order to obtain the conditioning air for cruising flight, it would have been necessary:
  first of all, severely to compress and heat in the aircraft engine the ambient air at 0.3 or 0.4 bar (0.3 or $0.4\times10^5$ Pa) in order to generate the hot stream at high pressure and high temperature;
  and then to reduce this high pressure severely to 0.75 bar ($0.75\times10^5$ Pa) and reduce this high temperature to approximately 20° C. in order to obtain the conditioning air.

It will also be noted that these energy savings become all the more considerable when it is considered that cruising flight, or flight close to cruising altitude, corresponds to the longest phase of use of an aircraft.

The energy source used to power said compressor and any temperature adjustment means there might be is preferably electrical or pneumatic.

In the customary case whereby said air conditioning system also includes means for tapping cold air off the cold stream of said turbine engine, said cold air thus tapped being sent to said hot air conversion means and used thereby to convert the hot air tapped off the turbine engine into conditioned air, it is advantageous for this system to comprise means for interrupting the tapping of cold air of L said turbine engine by said cold air tapping means when said conditioned air distributing means are being supplied from said auxiliary unit.

Thus any tapping of air off the cold stream of the engine and thus disturbances due to such tapping in cruising flight are thus avoided.

Thus, the aircraft air conditioning system according to the present invention makes it possible to reduce the fuel consumption in cruising flight and in flight close to cruising flight. In addition, it is easy to fit, because the auxiliary unit is simply juxtaposed with the customary main device which consists of said hot air tapping means, of said conversion means and of said distributing means, without any redesign of said main device. The auxiliary unit can easily be optimized because it is designed to operate only in one particular phase of flight and, to a certain extent, can also act as a redundant unit with respect to said main device, thus reducing the burden on the sizing of the latter.

BRIEF DESCRIPTION OF THE DRAWING

The FIGURE of the attached drawing will make it easy to understand how the invention may be achieved. This single FIGURE is a block diagram of the air conditioning system according to the present invention.

This FIGURE uses a chain line to schematically depict the fuselage 1 of an aircraft (not represented in any other way) that comprises at least one bypass turbine engine 2, the supply of ambient air to which is depicted symbolically by an arrow. Inside the fuselage 1 are also indicated schematically, in solid line, a cabin 3 of the aircraft, it being possible for this cabin 3 to represent the passenger cabin, the flight deck, or both.

DESCRIPTION OF THE PREFERRED EMBODIMENTS

The system according to the present invention and which is housed in the fuselage 1 comprises a main air conditioning device including, in the known way, a precooler 4 and a conditioner 5. The precooler 4 is able to receive, on the one hand, hot air at high temperature and high pressure via a line 6 which taps this air off the hot stream of the turbine engine 2 and, on the other hand, cold air via a line 7 which taps this cold air off the cold stream of said turbine engine 2. A pressure regulator 8 and a valve 9 are mounted on the line 6 while a valve 10 is mounted on the line 7.

Thus, when the valves 9 and 10 are in the open position, the precooler 4, of the heat exchanger type, may, using the hot air (the pressure of which has already been reduced by the regulator 8) and the cold air which it receives from the lines 6 and 7 respectively, generate a heated cold air stream which it discharges to the outside of the aircraft along a pipe 11, as well as a precooled hot air stream at reduced pressure which it sends to the conditioner 5 along a pipe 12. The conditioner 5, which also comprises a heat exchanger, finishes cooling and regulating the pressure of said precooled hot air stream using fresh air tapped from outside the aircraft by a pipe 13 and discharges heated fresh air to the outside of said aircraft through a pipe 14. At the outlet 15 of the conditioner 5, the air which is conditioned for temperature and for pressure is available for air-conditioning the cabin 3.

Also mounted inside the fuselage 1 is an auxiliary air conditioning unit including a compressor 16 and temperature adjusting means 17 (a heater and/or cooler) powered by an electrical or pneumatic power source 18 via a controllable switch 19. The compressor 16 can tap air from outside the fuselage 1 along a pipe 20, compress the tapped air then send the air thus compressed to the temperature adjusting means 17 along a pipe 21. Air conditioned for temperature and for pressure by the compressor 16 and said temperature adjusting means 17 may then be available at the outlet 22 of said means 17.

Inside the cabin 3, which is provided with a used-air extraction pipe 23 connecting it to the outside, there is a conditioned-air distributing device 24 supplied with conditioned air by the outlet 15 of the conditioner 5 or by the outlet 22 of said temperature adjusting means 17, according to the position of a switching valve 25 inserted between said distributing device 24, on the one hand, and the outlets 15 and 22, on the other.

The way in which the air conditioning system according to the present invention works is as follows:

A. When the aircraft is in a phase of flight for which it is surrounded by dry, low-pressure air unlikely to give rise to icing, that is to say in cruising flight or flight close to cruising flight, the valves 9, 10, 25 and the switch 19 are in their position depicted in dotted line in the FIGURE. Hence:

the valves 9 and 10 are closed and no air is tapped off the hot and cold streams of the engine 2. No conditioned air therefore appears at the outlet 15 of the conditioner 5;

the switch 19 is closed and the unit 16, 17 is powered by the source 18 and is therefore operational, which means that conditioned air appears at the outlet 22 of said temperature adjusting means 17; and the valve 25 places said outlet 22 in communication with the distributing device 24 which means that the cabin 3 is conditioned by the unit 16, 17.

B. In all the situations in which the aircraft finds itself other than the phase of flight specified in A. above, the valves 9, 10 and 25 and the switch 19 are in their position depicted in solid line in the FIGURE. Hence:

the switch 19 is open and the unit 16, 17 is non-operational because it is not powered by the source 18. No conditioned air therefore appears at the outlet 22 of the temperature adjusting means 17;

the valves 9 and 10 are open which means that air is tapped off the hot and cold streams of the engine 2 and conditioned air appears at the outlet 15 of the conditioner 5; and the valve 25 places said outlet 15 in communication with the distributing device 24 which means that the cabin 3 is conditioned in the customary way from air tapped off the streams of the engine 2.

The invention claimed is:

1. An air conditioning system for an aircraft provided with at least one turbine engine, the system comprising:
 a hot air tap line that taps hot air off a hot stream from said turbine engine;
 a cold air tap line that taps cold air off a cold stream from said turbine engine;
 a main air conditioning device comprised of:
  i) a precooler in fluid communication with the cold air from the cold tap line and the hot air from the hot tap line, wherein the precooler discharges a heated cold air stream to outside the aircraft and a precooled hot air stream, with the precooled hot air stream being discharged from the precooler at a pressure reduced from that at the hot air tap off of the hot air tap line, and
  ii) a conditioner, which conditions the temperature and pressure of the precooled, reduced-pressure hot air stream discharged from the precooler and discharges, through an outlet of the main air conditioning device, conditioned air for supplying to at least one cabin of the aircraft;
 a distributing device that distributes said conditioned air to at least one cabin of said aircraft;
 an auxiliary air conditioning unit configured for tapping low-pressure ambient air from outside said aircraft at cruising flight and discharging compressed air at an outlet of the auxiliary air conditioning unit, wherein the compressed air is conditioned at a pressure and temperature for air-conditioning the at least one cabin;
 a switching valve, between the distributing device and the outlets of the main air conditioning device and the auxiliary air conditioning unit, wherein the switching valve is configured to supply the distributing device:

with the compressed air from said auxiliary conditioning unit during the cruising flight, and with the conditioned air from said outlet of the main air conditioning device at a condition in which the compressed air from the auxiliary conditioning unit is not supplied to the distributing device; and a hot air open-close valve mounted on said hot air tap line and configured to close flow of the hot air at a condition in which the compressed air from the auxiliary air conditioning unit is supplied to said distributing device from said auxiliary air conditioning unit; and a cold air open-close valve mounted in said cold air tap line and configured to close flow of the cold air at a condition in which the compressed air from the auxiliary air conditioning unit is supplied to said distributing device from said auxiliary air conditioning unit.

2. The air conditioning system as claimed in claim 1, wherein said auxiliary air conditioning unit includes a compressor for compressing the low-pressure ambient air.

3. The air conditioning system as claimed in claim 2, wherein said auxiliary conditioning unit includes a temperature adjusting unit for adjusting the temperature of the compressed air.

4. The air conditioning system as claimed in claim1, wherein the main air conditioning device is further comprised of a pressure regulator for reducing the pressure of the precooled hot air stream discharged from the precooler.

5. The air conditioning system as claimed in claim 1, wherein the conditioner is comprised of a heat exchanger, which conditions the temperature and pressure of the precooled, reduced-pressure hot air stream discharged from the precooler by a supply of air from the outside the aircraft and discharges the supplied air as heated air to the outside of the aircraft.

6. The air conditioning system as claimed in claim 1, where the low-pressure ambient air tapped from outside said aircraft at cruising flight is at a pressure of about 0.3 to 0.4 bar ($0.3 \times 10^5$ to $0.4 \times 10^5$ Pa).

* * * * *